United States Patent [19]

DePalma

[11] E Re. 28,634

[45] Reissued Dec. 2, 1975

[54] REAR PROJECTION SCREEN

[75] Inventor: James J. DePalma, Rochester, N.Y.

[73] Assignee: Eastman Kodak Company, Rochester, N.Y.

[22] Filed: Mar. 25, 1974

[21] Appl. No.: 454,514

Related U.S. Patent Documents

Reissue of:

[64] Patent No.: 3,655,262
Issued: Apr. 11, 1972
Appl. No.: 69,863
Filed: Sept. 4, 1970

[52] U.S. Cl. ..... 350/126; 161/3.5
[51] Int. Cl. ..... G03b 21/60
[58] Field of Search ..... 350/126, 127, 129; 161/3.5

[56] References Cited

UNITED STATES PATENTS

| | | | |
|---|---|---|---|
| 1,389,357 | 8/1921 | Hochsteffer | 161/3.5 |
| 1,694,706 | 12/1928 | Herz | 161/3.5 |
| 2,071,836 | 2/1937 | Jenkins | 106/40 |
| 2,287,556 | 6/1942 | Land | 350/126 |
| 2,443,918 | 6/1948 | Lahousse et al. | 350/126 |
| 2,596,049 | 5/1952 | Siezen | 350/127 |
| 2,726,573 | 12/1955 | Maloff | 350/127 |
| 3,573,141 | 3/1971 | Lu et al. | 350/127 |
| 3,609,000 | 9/1971 | Miyano | 350/126 |
| 3,679,451 | 7/1972 | Marks et al. | 350/126 |

*Primary Examiner*—Richard M. Sheer
*Attorney, Agent, or Firm*—J. D. Husser

[57] ABSTRACT

A transmission type screen embodies a glass or plastic support having a color quality and ambient light control layer applied to the viewing side of the support. The layer comprises a dispersion of gelatin, fine particles of chlorinated diphenyl resin and a number of water-soluble dyes such as Toluidine Blue, Brilliant Acid, Cyanine Blue, Fast Light Red, Superchrome Yellow and Ethyl Orange. Such a screen structure provides an appropriate color temperature or color quality control and effectively eliminates the ambient light incident on the screen, thereby enhancing image contrast.

14 Claims, 4 Drawing Figures

REAR PROJECTION SCREEN

Matter enclosed in heavy brackets [ ] appears in the original patent but forms no part of this reissue specification; matter printed in italics indicates the additions made by reissue.

FIELD OF THE INVENTION

The invention relates to projection screens and more particularly to a rear projection screen having a layer on the viewing side which enhances the color quality of a projected image and reduces the effect of ambient light.

DESCRIPTION OF THE PRIOR ART

Conventional rear projection screens have a particular disadvantage in that they do not reject the ambient light to the extent necessary so that the projected image is one of high contrast and of good color quality. It is well known in the art that this situation can be somewhat improved by incorporating a light absorbing material along with a particulate material in the screen for redirecting the ambient and/or image light. In a screen in which a light absorbing material is embodied in the support, a good share of the ambient light is reflected from the surface of the screen before the absorbing material has a change to absorb any significant amount of the ambient light. As a result, little or no gain in effective ambient light relative to image light is realized with this technique. The ambient light reflected from the surface of the screen is due to the scattering type of light redirection caused by the actual screen structure and the type of surface on the side of the screen facing the viewer. Consequently, the projected image has low contrast, low color saturation and appears to the viewer as a washed-out image. For example, it is very difficult to reproduce black in a rear projection system without selective attenuation of the ambient light relative to the image light.

SUMMARY OF THE INVENTION

The primary object of the invention is to provide a projection screen having improved image contrast with good color quality and very little, if any, reflection to the viewer of ambient light.

Another object of the invention is to provide a rear projection screen which absorbs substantially all of the ambient light incident thereon, thereby presenting a color image having substantially the same contrast as the original being projected.

Still another object of the invention is to provide a rear projection screen having a light control layer on the viewing side of the screen which effectively reduces the color temperature of the original image to produce a better balanced color image and the ambient light incident on the layer by absorption through continual redirection.

The above objects and advantages of the invention are attained by applying or coating a layer on the viewing side of the screen which comprises a dispersion of a generally clear carrier medium, fine particles of chlorinated diphenyl resin and a plurality of light-absorbing dyes of different color. A specific screen structure embodies a glass or plastic support having a color quality and ambient light control layer applied to the viewing side of the support. The layer comprises a dispersion of gelatin, fine particles of chlorinated diphenyl resin and a number of water-soluble dyes such as Toluidine Blue, Brilliant Acid, Cyanine Blue, Fast Light Red, Superchrome Yellow and Ethyl Orange. It was found that such a screen structure provides an appropriate color temperature or color quality control and effectively eliminates the ambient light incident on the screen, thereby enhancing image contrast.

DESCRIPTION OF THE DRAWINGS

Reference is now made to the accompanying drawings wherein like reference numerals designate like parts and wherein.

DESCRIPTION OF THE PREFERRED EMBODIMENTS

Figure 1:
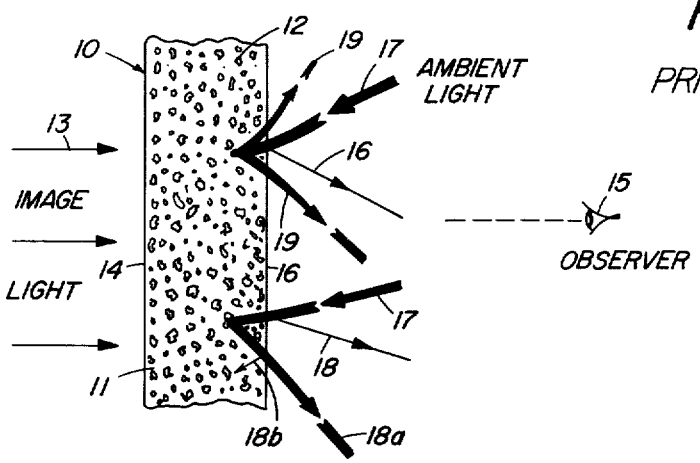
FIG. 1 PRIOR ART
FIG. 1 is an enlarged sectional view through a conventional screen having light scattering particles embodied therein and showing the effect of the ambient light incident on the viewing surface thereof.

A conventional rear projection screen 10 is shown in FIG. 1 in which the support 11 has light scattering elements or particles 12 incorporated therein. As shown by the arrows 13, the projected image light is incident on the back surface 14 of the screen and the observer 15 views the image by looking at the surface 16. The ambient light is shown by the lines 17, with arrows indicating the direction of the incident light. The manner in which such light can be reflected from the surface 16 before it enters the support 11 and can be redirected by the elements or particles 12 therein is designated schematically by the weighted lines. At least a portion of the ambient light on the viewer's side of the screen is reflected as designated by the arrows 18. The ambient light which is refracted upon entry into support 10 is scattered when an element or particle 12 is struck. The portion of this light that is redirected to surface 16 is again refracted (line 18a) or totally reflected (line 18b) depending on the angle of incidence. In any case, this type of screen returns a large amount of the ambient light to the observer, as indicated by the weight and number of return lines 19. This results in an image of low contrast and low color saturation. The light distribution is generally symmetrical about the projector axis and has a spread of the order of a plus or minus 20°–30° or more.

Some screens use a material in which the particles embodied therein absorb the ambient light or a second component, which can be a scattering or non-scattering component, mixed in with the material forming the primary component or support. This technique is only partly successful in that there is always a back-scattered component from the particles and a good share of the ambient light is reflected, as mentioned above, because the reflection occurs at the surface 16 and before the absorbing material has a change to become of any value. In this case, an essentially equal amount or more of the image light 13 is also absorbed and therefore little or no gain in effective ambient light relative to image light absorption is realized.

Figure 2:
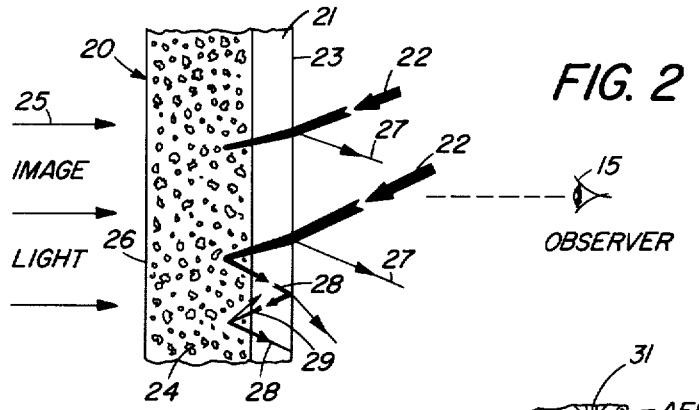
FIG. 2 is a vertical section through a screen embodying the invention in which a color and ambient light control layer is applied to the viewing surface and showing the manner in which ambient light is absorbed and redirected by such a layer.

The screen 20 shown in FIG. 2 has a dyed, transparent (non-scattering), absorbing layer 21 on the viewer's side of the screen. The ambient light is designated by lines 22 with arrows indicating the light direction and, upon striking the surface 23 of layer 21, most of this light is refracted rather than reflected. A very small portion of the ambient light is reflected by surface 23 as indicated by lines 27. The light travels through the layer 21, usually obliquely, and in most instances, the remaining light is for the most part absorbed by the dyes incorporated in the layer 21. A good share of the ambient light remaining after the initial transit through the dye layer 21 is also absorbed but in the following manner. The ambient light remaining after the first pass through the dye layer 21 strikes the screen particles 24 and is redirected more or less randomly in all directions, so that a significant fraction might re-enter the dyed layer 21 due to the back-scattering in all directions. The light which has re-entered layer 21 in this manner again travels through the dye layer 21 and has another change to be absorbed and substantially reduced (lines 28). It should be pointed out that the spreading of the back-scattered ambient light allows a relatively large share of the light to go through the dye layer at high angles, thus traveling through proportionately more of the dye layer and, equally important, strikes the dye layer-air surface at all angles with a good share of the light incident at angles greater than the critical angle. This means that most of this light is reflected back through the dye layer (line 29) a third time and the process is repeated over and over.

Relatively very little of this light action occurs to the image light 25 that is incident on the surface 26 of screen 20. The image light in its transit through the screen 20 is redirected for the viewing application by the screen elements before going through the non-scattering absorbing layer 21. In addition, the forward scattered light is generally much larger than the backward scattered light and further is incident upon the particulate layer at, or close to, normal angles of incidence and therefore travels through the dye layer 21 in a more normal and shorter path than the ambient light.

All of these factors add up to a significantly more efficient screen in terms of brightness, contrast and image color saturation compared to a screen having no ambient light control or with an ambient light control using absorbing material in situ with the light scattering particles.

The system in the subject invention provides excellent ambient light control for a scattering type projection screen. The density of the dye, the thickness of the dye layer or the preference of optical or physical control of the dyed layer with the screen material or support depends on the characteristics of the screen material per se. The amount and kind of ambient light, the intensity of the image light as well as other factors also affect the resultant image. One of the very important advantages of the use of a non-scattering dye layer is that while it is being used as an efficient ambient light control element it can also be used to control the color quality of the light in the projected image. It has proven to be desirable to correct the color temperature of the light source used in such rear projection devices which are typically thermal in nature and therefore too warm in color quality (2600°K to 3000°K), to a more desirable and cooler quality (3800°K to 5000°K). The dye layer 21 can accomplish this in a position relative to the screen support as shown in FIG. 2. Also, if required, a spectral energy match to any desired color quality can be made.

Figure 3:
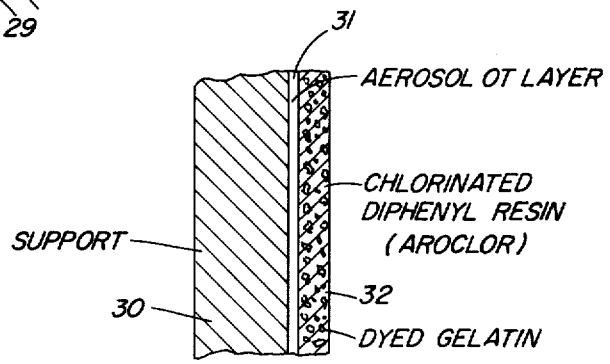
FIG. 3 is a vertical section through a screen constructed in accordance with the invention and showing the relation of the light absorbing layer to the screen support.

With particular reference to FIG. 3, a screen structure in accordance with the invention is specifically set forth. A support or material 30 which is of a transparent material is coated on one surface thereof with a layer 31 which can be a thin film of Aerosol. The dye layer 32 is then applied to or coated over the Aerosol layer and some of the various compositions that this layer 32 can comprise are set forth in Examples hereinbelow.

The Examples set forth hereinbelow disclose a screen structure having a color correction and ambient light control layer with the qualities described hereinabove. The Examples are in no way to be considered as limitations of the invention.

EXAMPLE 1

A standard, commercially available rear projection screen, was cleaned, subbed and over-coated with a layer having a composition as set forth hereinbelow at 80.4 cc per 11 ½ inches square samples.

| | |
|---|---|
| 240 cc | 15% gelatin |
| 16.8 cc | 1% Toluidine Blue |
| 11.4 cc | 1% Acid Brilliant Cyanine Blue BLE |
| 6.0 cc | 1% Fast Light Red BA |
| 31.2 cc | 0.1% Superchrome Yellow GN |
| 36.9 cc | 0.1% Ethyl Orange Dye 319 Total |
| Total | 600 cc water to make |

Approximately 180 cc of 0.10 percent Aerosol OT in water was added to this solution as a coating aid (Aerosol OT being a registered trademark of American Cyanamid Co. for a wetting agent and surface-tension depressant). After coating and drying for 24 hours, the surface was sprayed lightly with a layer of transparent lacquer. On practical visual tests using a screen in a commercial film reader, it was found the ambient light control was enhanced as evidenced by the blackness of the screen with the projection lamp off in a room with 150 foot candles of ambient light. The color control was indicated by measurement with a color temperature meter. Color saturation was retained in the projected image and the brightness range extended; that is, blacks were blacker and whites were whiter when compared with a standard rear projection screen having only an ambient light absorption control coating.

EXAMPLE 2

Example 1 was repeated using a polypropylene screen, such as that disclosed in U.S. application Ser. No. 838,716, filed July 2, 1969, now U.S. Pat. No. 3,591,253. The ambient light control and image color were enhanced, as in Example 1. An additional advantage was realized in that this screen system exhibited not only good brightness and contrast but essentially no scintillation. The dye layer can be readily affixed to this non-scintillating type of screen.

EXAMPLES 3–6

The following formulas were used on a rear projection screen of the type used in Example 1 and on a polyproplyene screen of the type used in Example 2 to control both ambient light and color temperature.

| | Ex. 3 | Ex. 4 | Ex. 5 | Ex. 6 |
|---|---|---|---|---|
| Gelatin 15% in water | 80 cc | 80 cc | 80 cc | 80 cc |
| Toluidine Blue (1%) | 2.8 cc | 3.5 cc | 4.2 cc | 4.90 cc |
| Acid Brilliant Cyanine Blue (1%) | 1.9 cc | 2.38 cc | 2.85 cc | 3.33 cc |
| Fast Light Red BA (1%) | 1.0 cc | 1.24 cc | 1.50 cc | 1.75 cc |
| Superchrome Yellow GN (0.2%) | 5.2 cc | 6.50 cc | 7.80 cc | 9.100 cc |
| Ethyl Orange Dye 319 (0.1%) | 4.48 cc | 5.60 cc | 6.72 cc | 7.84 cc |
| Glycerine 50% | 20 cc | 20 cc | 20 cc | 20 cc |
| Water to | 200 cc | 200 cc | | |
| Aerósol OT 0.1% in Water | 13.1 cc | 13.1 cc | 13.1 cc | 13.1 cc |

The color temperature conversion for each screen is in the range of approximately 2850°–3400°K and the series contains increasing amounts of non-selective, non-scattering absorption for controlling higher ambient light levels. These layers all showed improved contrast and brightness range.

EXAMPLE 7

The solution of Example 5 was diluted to 300 cc total and the amount of glycerine was increased to 30 cc. This solution was coated on (1) a specular surfaced screen of the type used in Example 1, and (2) a semi-matte overcoating sprayed over the dye layer on a screen of the type used in Example 1, both being cleaned and subbed prior to coating. After drying, the screens were placed in experimental viewers and compared with a conventional coated screen as a test screen. It was noted the ambient light was reduced considerably and the image color quality was much enhanced.

EXAMPLE 8

Two 8 × 10 inches optically flat glass plates were coated on one surface with a dispersion of a standard Aroclor resin in gelatin as described in U.S. Ser. No. 814,006, filed Apr. 7, 1969; on the opposite surface of one glass plate, which surface will be the front surface of the screen, a alyer of dyes in gelatin of the following formula was coated using 48.6 cc of the solution for the plate. (Aroclor is a registered trademark of Monsanto Chemical Co. for a resin used to impart moisture and chemical resistance.)

| | | |
|---|---|---|
| 80 cc | 15% | gelatin in water |
| 0.88 cc | 1% | Toluidine Blue |
| 0.60 cc | 1% | Acid Brilliant Blue BLI |
| 0.32 cc | 1% | Fast Light Red BA |
| 1.64 cc | 0.1% | Superchrome Yellow |
| 1.40 cc | 0.1% | Ethyl Orange |
| 20 cc | 50% | Glycerine |

Water to 200 cc, then 14.59 of 0.1 percent Aerosol was added as a coating aid.

The coating was dried and then sprayed with a layer of transparent lacquer. The plates were then assembled with a layer of silicone rubber therebetween as described in U.S. Ser. No. 814,006 with the dye layer on the viewing side of the screen. The plates were then mounted in the orbiting device of U.S. Ser. No. 813,936, filed Apr. 7, 1969, and set in motion. The results were similar to those reported above and particularly to those noted in Example 2.

EXAMPLE 9

Example 8 was repeated except that the dye layer was coated in half the concentration on each glass plate, so that half the dye layer was, in effect, on the inside of the viewer and orbited with the rear plate forming the screen. The lacquer overcoat was omitted from the rear plate as no protection was needed. The results noted were substantially the same as those of Example 8.

EXAMPLE 10

A glass plate was cleaned and Aerosol OT in water was first applied to a surface of the plate. A layer having a composition as set forth hereinbelow was coated on the prepared surface.

| | | |
|---|---|---|
| 436.78 cc | 15% | Gelatin |
| 260.72 cc | | Aroclor |
| 62.05 cc | 1% | Aerosol OT |
| 4.10 cc | 1% | Toluidine Blue |
| 27.34 cc | 1/10% | Acid Brilliant Cyanine Blue BLI |
| 15.04 cc | 1/10% | Fast Light Red BA |
| 7.67 cc | 1/10% | Superchrome Yellow GN |
| 6.53 cc | 1/10% | Ethyl Orange |
| 179.77 cc | | Distilled Water |
| 1000.00 cc | | Total |

It was noted that the screen did not reflect any appreciable amount of ambient light and the image color qulaity was very good.

Figure 4:
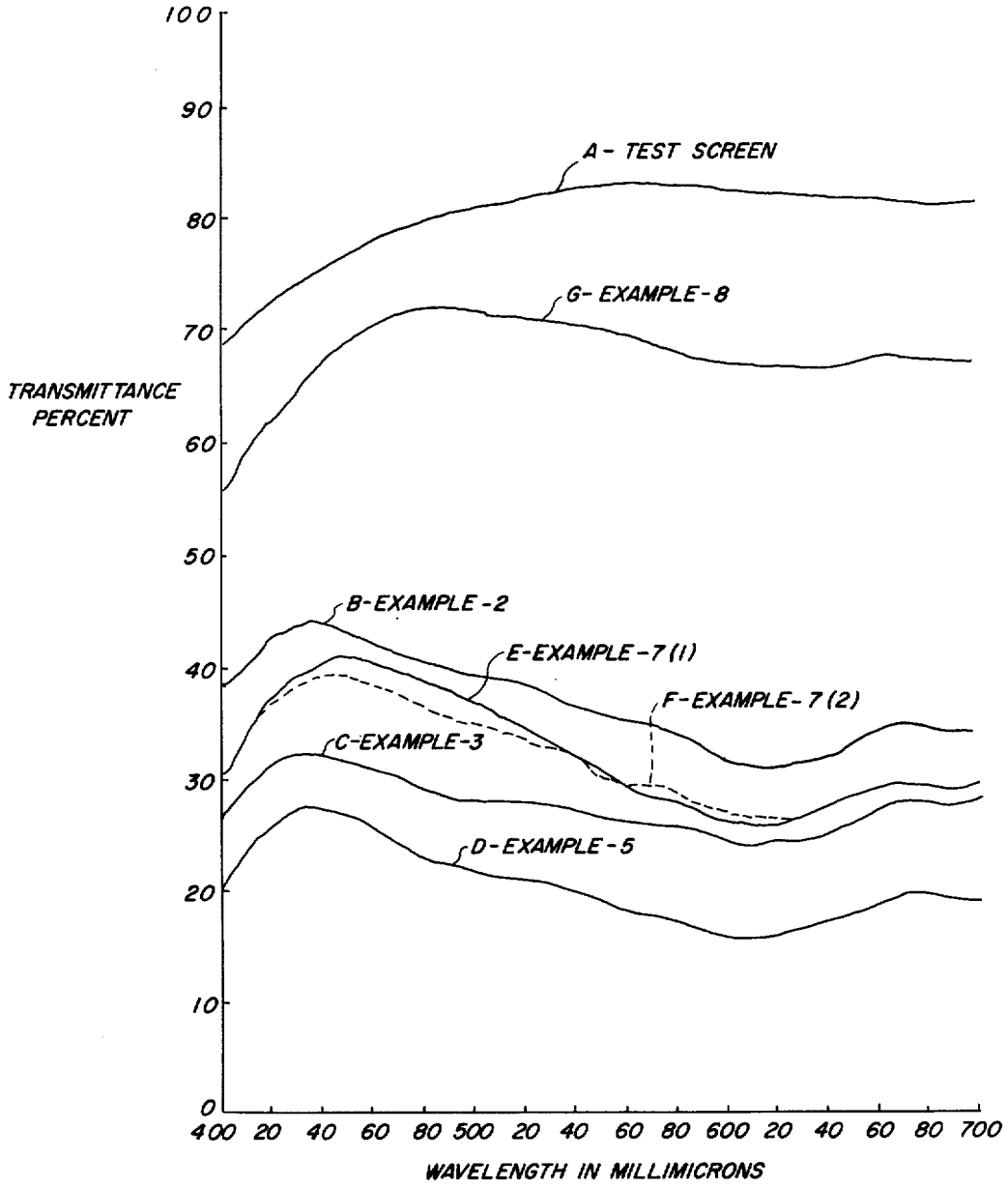
FIG. 4 is a family of transmission-color curves showing the manner in which the projected image is color corrected at the screen.

With reference to FIG. 4, curve A shows the transmittance-wavelength (color) characteristics for a test screen that provided a comparison basis as set forth in the above examples. Such a screen comprises a glass plate having a light control layer coated on one surface thereof. Such a layer comprises a dispersion of gelatin and chlorinated diphenyl resin (Aroclor). The screen with such a layer transmits about 70–85 percent of the light incident thereon, the higher percentage being in the frequency of the yellow-orange-red colors. As a result, white does not appear as such in the projected image, but rather yellowish. Likewise, black appears to be hazy and not a true black. When the reflected ambient light is added to such a projected image, the contrast is still further reduced.

Curves B–F disclose light control layers in accordance with the invention wherein more light is transmitted in the blue frequency range. Although less light is actually transmitted, the contrast is enhanced because the yellow-orange-red frequencies do not predominate, the contrast being enhanced because of the absorption of the ambient light.

Curve G discloses a screen which transmits primarily in the blue-green frequency range with a higher percentage of total transmittance. However, this screen comprises two glass plates which are orbited relative to one another and, hence, a screen of somewhat different structure is set forth in this example.

In instances where the projection screen is such that it permits a much higher than normal ratio of forward to back-scattered light in the screen material, it may be advantageous to use a non-scattering dye system in a separate layer on the screen surface facing the light source. Also, it is possible that a non-scattering layer can be used on both the front and back surface with a factor of absorption differential.

The screen support 30 can consist of plastic particles embedded in a clear resin coated on glass or a suitable transparent, plastic material, such as vinyl, methylacrylate, etc., or the carrier resin itself may be self-supporting. It is conceivable therefore that the non-scattering dye layer 32 can be dispersed in any number of non-scattering carrier media such as gelatin, methylacrylate, glass, polystryene, etc., and subsequently coated on or placed as a separate sheet in physical contract with the screen support 30. Also, the surfaces of the non-scattering dye layer 32 can be made either specular, semispecular or diffuse depending on the nature of the projection situation to be accommodated.

The invention has been described in detail with particular reference to preferred embodiments thereof, but it will be understood that variations and modifications can be effected within the spirit and scope of the invention.

I claim:

1. A screen material for transmission type projection screens having color quality and ambient light control comprising a dispersion of a generally clear carrier medium, fine particles of chlorinated diphenyl resin and a plurality of light absorbing dyes of [different] *blue, light red, yellow and orange* color.

2. A screen material in accordance with claim 1 wherein said carrier medium is gelatin.

3. A screen material in accordance with claim 1 wherein said carrier medium is a generally transparent plastic material.

4. A screen material in accordance with claim 1 wherein said carrier medium is methacrylate.

5. A screen material in accordance with claim 1 wherein said carrier medium is polystyrene.

[6. A screen material in accordance with claim 1 wherein said light absorbing dyes are blue, light red, yellow and orange in color.]

7. A rear projection screen comprising a generally transparent support and a color quality and ambient light control layer applied to at least the viewing side of said support, said layer comprising a dispersion of a generally clear carrier medium, fine particles of chlorinated diphenyl resin and a plurality of light absorbing dyes of [different] *blue, light red, yellow and orange* color.

8. A rear projection screen in accordance with claim 7 wherein said support is glass.

9. A rear projection screen in accordance with claim 7 wherein said support is a generally transparent plastic material.

10. A rear projection screen in accordance with claim 7 wherein said carrier medium is gelatin.

[11. A rear projection screen in accordance with claim 7 wherein said dyes are blue, light red, yellow and orange in color.]

12. A rear projection screen comprising a generally transparent plastic support and a color quality and ambient light control layer applied to at least the viewing side of said support, said layer comprising a dispersion of gelatin, fine particles of chlorinated diphenyl resin and a plurality of light absorbing dyes which are Toluidine Blue, Brilliant Acid Cyanine Blue, Fast Light Red, Superchrome Yellow and Ethyl Orange in color.

*13. A rear projection screen having an image light redirecting layer having minute light scattering elements dispersed in a transparent material, and a non-light scattering, ambient light control layer in contact with the viewer side of the redirecting layer and having a plurality of light absorbing dyes of blue, light red, yellow and orange colors incorporated in a generally transparent carrier medium.*

*14. A rear projection screen according to claim 13 wherein the image light redirecting layer comprises chlorinated diphenyl resin dispersed in a transparent material.*

*15. A rear projection screen according to claim 13 wherein the colors of said dyes are Toluidine Blue, Brilliant Acid Cyanine Blue, Fast Light Red, Superchrome Yellow and Ethyl Orange.*

*16. A rear projection screen comprising*

*a first generally transparent layer having chlorinated diphenyl resin dispersed therein for redirecting image light; and*

*a second generally transparent layer in contact with the viewer side of the first layer and having a plurality of light absorbing dyes of different color incorporated therein, the color of said dyes being chosen from the color group of blue, light red, yellow and orange to alter the color temperature of image light.*

* * * * *